United States Patent [19]

Chung et al.

[11] Patent Number: 5,087,665

[45] Date of Patent: Feb. 11, 1992

[54] TOUGHENED, HYDROLYSIS RESISTANT POLYCARBONATE/POLYESTER BLENDS

[75] Inventors: James Y. J. Chung, Wexford; John J. Charles, Upper St. Clair; Nelson R. Lazear, McMurray, all of Pa.

[73] Assignee: Mobay Corporation, Pittsburgh, Pa.

[21] Appl. No.: 453,557

[22] Filed: Dec. 20, 1989

[51] Int. Cl.$^5$ .............................................. C08L 69/00
[52] U.S. Cl. ................................. 525/133; 525/146
[58] Field of Search ............................. 525/133, 146

[56] References Cited

U.S. PATENT DOCUMENTS

| | | | |
|---|---|---|---|
| 3,431,224 | 3/1969 | Goldblum | 260/13 |
| 3,437,631 | 4/1969 | Cleveland | 260/37 |
| 4,476,274 | 10/1984 | Liu | 524/445 |
| 4,481,330 | 11/1984 | Ohara | 525/67 |
| 4,482,672 | 11/1984 | Neuray et al. | 525/67 |
| 4,554,314 | 11/1985 | Chung et al. | 525/67 |
| 4,562,222 | 12/1985 | Liu | 524/505 |
| 4,563,502 | 1/1986 | Liu | 525/146 |
| 4,564,658 | 1/1986 | Liu | 525/177 |
| 4,639,481 | 1/1987 | Giles, Jr. | 524/128 |
| 4,780,357 | 10/1988 | Akao | 428/216 |
| 4,883,840 | 11/1989 | Cartasegna | 525/146 |

FOREIGN PATENT DOCUMENTS

| | | |
|---|---|---|
| 122601 | 10/1984 | European Pat. Off. . |
| 322095 | 6/1989 | European Pat. Off. . |
| 1007724 | 10/1965 | United Kingdom . |

*Primary Examiner*—John C. Bleutge
*Assistant Examiner*—David Buttner
*Attorney, Agent, or Firm*—Joseph C. Gil; Aron Preis

[57] ABSTRACT

It was surprisingly found that a thermoplastic molding composition which contains polycarbonate and polyalkylene terephthalate resins at a particular weight ratio therebetween is rendered improved impact strength and hydrolysis resistance upon the incorporation of an additive amount of high melt flow high density polyethylene therewith. The molding composition of the invention comprise about 20–90 percent of polycarbonate resin, 80–10 percent of polyalkylene terephthalate (preferably PET) and about 3 to 5 percent of a high density polyethylene resin having a specific gravity of 0.94–0.97 and melt flow of 1 to 80 gm/10 min. as determined in accordance with ASTM D 1238.

1 Claim, 1 Drawing Sheet

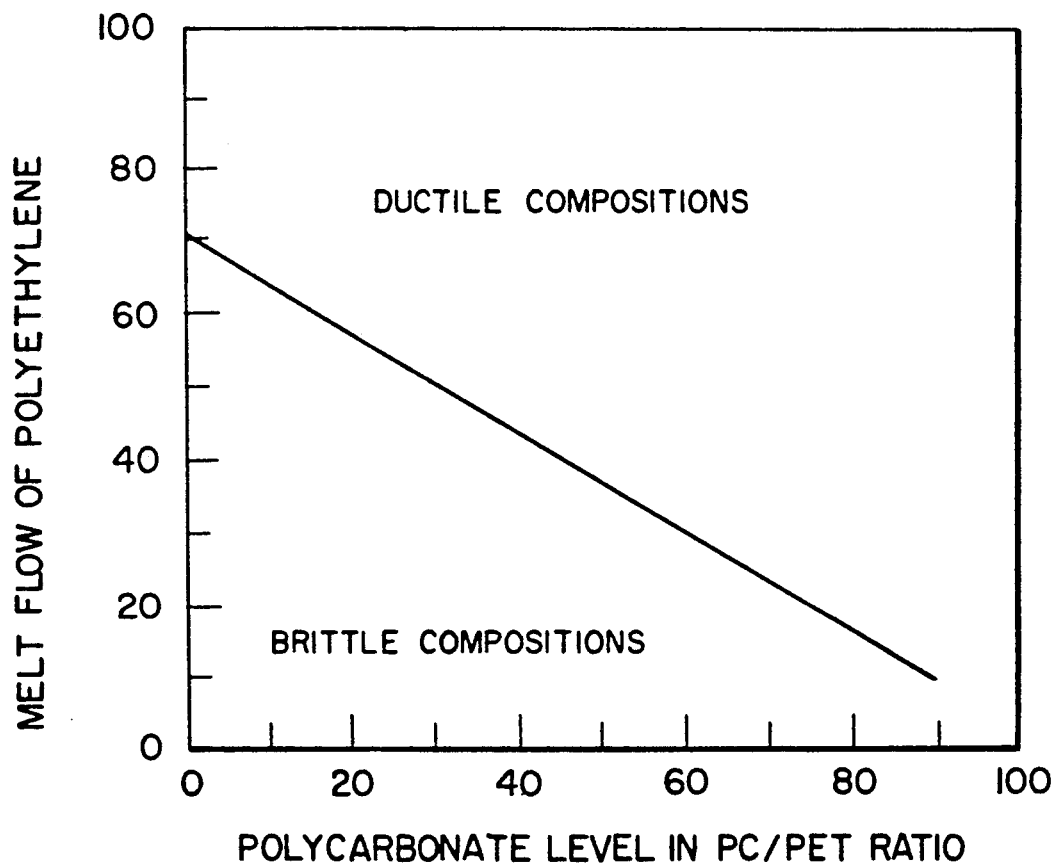

TOUGHENED, HYDROLYSIS RESISTANT POLYCARBONATE/POLYESTER BLENDS

FIELD OF THE INVENTION

The present invention is directed to a thermoplastic molding composition and more particularly to a composition containing polycarbonate and polyester resins.

BACKGROUND OF THE INVENTION

Polycarbonate molding compositions were reported in U.S. Pat. Nos. 3,431,224 and 4,562,222 to be imparted improved resistance to environmental stress crazing and cracking upon the incorporation of polyethylene or its copolymers therewith. Blends containing polycarbonate, polyalkylene terephthalate and a graft modified butadiene rubber have been disclosed in U.S. Pat. No. 4,554,314. Weld line strength improvement was reported (U.S. Pat. No. 4,563,502) to characterize polycarbonate compositions which contain a linear low density polyethylene. Correspondingly, U.S. Pat. No. 4,564,658 reported thermoplastic molding compositions which contain a thermoplastic polyester resin and a linear low density polyethylene, the compositions having improved compatibility and mold releasability. Impact strength improved polycarbonate compositions containing polyethylene were reported in U.S. Pat. No. 3,437,631. Glass reinforced compositions containing polyethylene terephthalate and linear low density polyethylene were disclosed in U.S. Pat. No. 4,476,274. In U.S. Pat. No. 4,482,672 there are disclosed molding compositions containing polycarbonate resin, polyalkylene terephthalate resin, a particular graft copolymer and an ethylene polymer. The melt flow of the ethylene polymer is within a wide range—see column 7, line 51.

SUMMARY OF THE INVENTION

It was surprisingly found that a thermoplastic molding composition which contains polycarbonate and polyalkylene terephthalate resins at a particular weight ratio therebetween is rendered improved impact strength and hydrolysis resistance upon the incorporation of an additive amount of high melt flow polyethylene therewith. The molding composition of the invention comprise about 20–90 percent of polycarbonate resin, 10–80 percent of polyalkylene terephthalate and about 3 to 5 percent of polyethylene resin having a melt flow of 1 to 80 gm/10 minutes. The invention is predicated primarily on the finding that the improved impact performance of articles molded from the compositions, manifest by their ductile break, is associated with compositions wherein melt flow of the polyethylene is inversely proportional to the level of polycarbonate resin in the blend.

DETAILED DESCRIPTION OF THE INVENTION

The invention is predicated primarily on the finding that the improved impact performance of articles molded from the novel composition, as manifest by their ductile break, is associated with compositions wherein melt flow of the polyethylene is inversely proportional to the level of polycarbonate resin in the blend.

DESCRIPTION OF THE DRAWING

In the enclosed FIGURE there is a graphical representation of the findings which give rise to the invention. The graph shows that at any polycarbonate resin level a minimum threshold value for polyethylene melt flow must be realized before ductile performance is achieved. Polyethylene melt flow values in excess of the threshold value at a given polycarbonate resin level also provide ductile performance. Polyethylene melt flow values lower than the threshold values results in brittle failures.

The molding composition of the invention is suitable for the preparation of molded articles which are characterized by their improved impact performance. Ductile break upon failure which is a characteristic of such articles makes the composition particularly suitable for molding articles where brittle behavior is unacceptable.

The high molecular weight, thermoplastic polyester resin suitable in the practice of the invention are derived from an aromatic dicarboxylic acid and a diol component and are characterized in that their intrinsic viscosity is at least 0.4 deciliters per gram. Optionally, the aromatic dicarboxylic acid component accounts for at least 85 mole percent of the dicarboxylic acid component. Among the suitable aromatic dicarboxylic acids are terephthalic acid, isophthalic acid, napthalenedicarboxylic acid, diphenylether dicarboxylic acid, diphenyldicarboxylic acid, diphenylsulfone dicarboxylic acid and diphenoxyethane dicarboxylic acid. The optional, at most 15 mole percent of the acid component which is not aromatic dicarboxylic, may be represented by hydroxycarboxylic acids and by aliphatic dicarboxylic acids such as succinic acid, adipic acid and sebacic acid.

The diol component of these polyesters may contain from 2 to 10 carbon atoms, preferably from 2 to 4 carbon atoms in the form of linear methylene chains with up to 30 mole percent of one or more other aliphatic diols having 3 to 8 carbon atoms, cycloaliphatic diols having from 6 to 15 carbon atoms or aromatic diols having from 6 to 21 carbon atoms. Examples of such additional diols ("codiols") include 3-methylpentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-(-hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane and 2,2-bis(4-hydroxypropoxyphenyl)-propane.

Typical examples of the diol include ethylene glycol, trimethylene glycol, tetramethylene glycol and hexamethylene glycol, neopentyl glycol, cyclohexane dimethylol, tricyclodecane dimethylol, 2,2-bis-(4-hydroxyethoxy-phenyl)-propane, 4,4'-bis-(-hydroxyethoxy)-diphenylsulfone, and diethylene glycol.

The polyesters may be branched by incorporating trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable to use no more than 1 mole percent of branching agent, based on the quantity of acid component. The polyesters may also contain known monofunctional compounds such as phenol or benzoic acid as chain terminators.

The preferred polyesters are characterized in that their structure comprises units of the general formula (1).

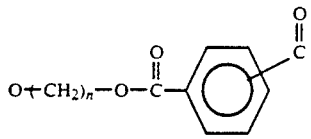 (1)

wherein n denotes 2 to 4

The intrinsic viscosity characterizing the suitable polyester resins in the practice according to the invention should preferably be in the range of 0.4 to 1.4 grams per deciliter and, more preferably, between 0.4 and 1.1 grams per deciliter, as measured in a 1 percent solution of phenol and tetrachloroethane (60:40) at 25° C.

Methods for the preparation of the polyester resin suitable in the present context are known and have been described in U.S. Pat. Nos. 2,463,319 and 3,047,539.

The composition of the invention may include crystallization rate promoters for the polyester (such as oligomeric polyesters) to allow lower mold temperatures and shorter injection cycles. Suitable promoters have been taught in U.S. Pat. No. 4,223,113 which disclosure is incorporated herein by reference.

The most preferred poly(alkylene terephthalate) in the present context is poly(ethylene terephthalate).

The polycarbonate resins useful in the practice of the invention are homopolycarbonate, copolycarbonate and terpolycarbonate resins or mixtures thereof. The polycarbonate resins generally have molecular weights of 10,000-200,000 (weight average molecular weight) preferably 20,000-80,000, and are additionally characterized by their melt flow of 1-24 gm/10 min. at 300° C. per ASTM D-1238. These polycarbonate resins may be prepared, for example, by the known diphasic interface process from phosgene and dihydroxy compounds by polycondensation (see the monograph H. Schnell, Chemistry and Physics of Polycarbonates, Interscience Publishers, New York, 1964, incorporated herein by reference).

In the present context, dihydroxy compounds suitable for the preparation of the polycarbonates of the invention conform to the structural formula (1) or (2)

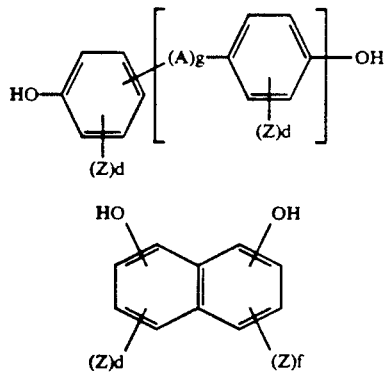

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, S, —SO— or —SO$_2$-radical; a radical of the general formula

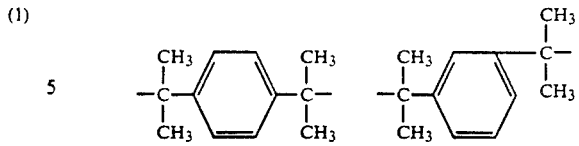

g denotes the number of 0 or 1;
e denotes the number of 0 or 1;
Z denotes F, Cl, Br or C$_1$-C$_4$ alkyl and if several Z radicals are substituents in one aryl radical, they may be identical or different;
d denotes 0 or an integer of from 1 to 4; and
f denotes 0 or an integer of from 1 to 3.

Among the useful dihydroxy compounds in the practice of the invention are hydroquinone, resorcinol, bis-(hydroxyphenyl)alkanes, bis-(hydroxyphenyl)-cycloalkanes, bis-(hydroxyphenyl)ethers, bis-(hydroxyphenyl)-ketones, bis-(hydroxyphenyl)sulfoxides, bis-(hydroxyphenyl)-sulfones and 2,2-bis-(hydroxyphenyl)-diisopropyl-benzenes. These and further suitable aromatic dihydroxy compounds are described, for example in U.S. Pat. Nos. 3,028,365, 2,999,835, 3,148,172, 3,271,368, 2,991,273, 3,271,367, 3,280,078, 3,014,891 and 2,999,846 (all incorporated herein by reference), in German Offenlegungsschriften (German Published Specifications) Nos. 1,570,703, 2,063,050, 2,063,052, 2,211,956 and 2,211,957, in French Patent Specification No. 1,561,418 and in the monograph, H. Schnell, Chemistry and Physics of Polycarbonates, Interscience Publishers, New York, 1964. Further examples of suitable bisphenols are 2,2-bis-(4-hydroxy-phenyl)-propane (bisphenol A), 2,4-bis-(4-hydroxyphenyl)-2-methylbutane, 1,1-bis-(4-hydroxyphenyl)-cyclohexane, 2,2-bis-(4-hydroxyphenyl)-p-diisopropylbenzene, 2,2-bis(3-chloro-4-hydroxyphenyl)-propane, hydroxybenzophenone and 4,4'-sulfonyl diphenol.

The most preferred bisphenol is 2,2-bis-(4-hydroxyphenyl)propane (bisphenol A).

The polycarbonates of the invention may entail in their structure, units derived from one or more of the suitable bisphenols.

The preparation of polycarbonate resins may be carried out in accordance with any of the processes known in the art, for example, by the interfacial polycondensation process, polycondensation in a homogeneous phase or by transesterification.

The suitable processes and the associated reactants, catalysts, solvents and conditions are known in the art and have been described, inter alia, in German Patent Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention, monofunctional reactants such as monophenols may be used in order to limit their respective molecular weights. Also, branching agents may be employed. Branching may be obtained by the incorporation of small amounts, preferably of between about 0.05 and 2.0 mol percent (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxy-phenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 6-bis-(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl)-phenyl)orthoterephthalic acid ester, tetra-(4-hydroxyphenyl)-methane, tetra-(4-(4-hydroxyphenylisopropyl)-phenoxy)-methane and 1,4-bis-(4'-4"-dihydroxytriphenyl)-methyl)-benzene. Some of the other trifunctional compounds are 2,4-dihydroxy-benzoic acid, trimesic acid, dyanuric chloride and 3,3-bis-(4-hydroxyphenyl)-2-oxo-2,3-dihydroindole.

Among the resins suitable in the practice of the invention are included phenolphthalene based polycarbonate, copolycarbonates and terpolycarbonates such as are described in U.S. Pat. Nos. 3,036,036 and 4,210,741, both incorporated by reference herein.

The polyethylene resin suitable in the present invention is well known and may be prepared by skilled artisans by following methods known in the art. Alternatively, the polyethylene may be procured in commerce such as under the trade name of Petrothene. Specifically, the polyethylene resin may be described as high density polyethylene having a specific gravity of about 0.941–0.965 and in that its melt flow index as measured in accordance with ASTM D-1238 is about 1 to 80, preferably 3 to 60 gm./10 min.

The composition of the invention is characterized in that the weight ratio of the components polycarbonate/polyalkylene terephthalate/polyethylene is from about 20–90/80–10/3–5, preferably, the ratio is about 65–75/35–25/3–5.

The composition of the invention may contain additives and agents such as are known in the art to impart certain known properties in thermoplastic molding compositions. Among these are plasticizers, heat and hydrolysis stabilizers, pigments, fillers and reinforcing agents as well as flame retardants of various types.

The invention is further illustrated but is not intended to be limited by the following examples in which all parts and percentages are by weight unless otherwise specified.

EXAMPLES

Compositions in accordance with the invention have been prepared and articles were molded therefrom and tested. In the compositions, the polycarbonate was Makrolon 2800 resin, a homopolycarbonate based on bisphenol-A, characterized in that its melt flow index is about 9 gm./10 min., a product of Mobay Corporation; the polyethylene terephthalate was Tenite 12270 resin from Eastman Kodak characterized in that its inherent viscosity is about 0.59; and the polyethylene was Petrothene, a product of U.S. Industrial Chemicals, having a density of 0.95 gm/cc and a melt flow of 23.0. In the comparative examples which were similarly processed, molded and tested, the polyethylene was Petrothene, having a density of 0.95 gm/cc and a melt flow of 9.5.

The compositions were prepared following conventional procedures and the molding was carried out by injection using the following process parameters:

| Extrusion conditions: | |
|---|---|
| Extruder: Werner & Pfleiderer Corp. | |
| ZSK 30 Twin screw extruder; | |
| Zone set temperature (°C.) | |
| 1 | off |
| 2 | off |
| 3 | 250 |
| 4 | 260 |
| 5 | 270 |
| die | 280 |
| Screw Speed (RPM) 300; Vacuum - on | |
| Molding conditions: | |
| Machine: 3 oz. Newbury | |
| Zone set Temperature (°C.) | |
| 1 | 260 |
| 2 | 260 |
| nozzle | 260 |
| Injection pressure (psi) | |
| first stage | 10,000 |
| second stage | 8,000 |
| Cycle time (sec) | |
| First stage | 5 |
| second stage | 10 |
| total | 30 |
| Mold temperature (°C.) | 74 |

The tables below summarize the results:

In Table 1 there are presented data showing the impact strength of PET-rich compositions wherein weight ratio of the resinous components is about 40/60 (polycarbonate/PET). The addition of polyethylene of high or of low melt flow appears to have no appreciable effect on the impact strength of these compositions.

TABLE 1

| | Example | |
|---|---|---|
| | 1-1 | 1-2 |
| Polycarbonate, wt. % | 39 | 39 |
| PET, wt. % | 59 | 59 |
| Polyethylene (melt flow 23.0) wt. % | 2 | — |
| Polyethylene (melt flow 9.5) wt. % | — | 2 |
| Impact Strength, ft-lb/in @ ⅛" Notched Izod | 1.1 | 1.2 |

In an additional set of experiments where the weight ratio between the resinous components was about 70/30 (polycarbonate/PET), the addition of a small amount (2%) of polyethylene, of either melt flow, appeared to have no appreciable effect on the impact strength of the resulting compositions—see Table 2.

TABLE 2

| | Example | | |
|---|---|---|---|
| | 2-1 | 2-2 | 2-3 |
| Polycarbonate, wt. % | 68.5 | 68.5 | 70.0 |
| PET, wt. % | 29.5 | 29.5 | 30.0 |
| Polyethylene (melt flow 23.0) wt. % | 2 | — | — |
| Polyethylene (melt flow 9.5) wt. % | — | 2 | — |
| Impact Strength, ft-lb/in @ ⅛" Notched Izod | 2.5 | 2.4 | 2.0 |

In yet an additional set of experiments, it was found that the impact performance of PET-rich compositions, PET/polycarbonate weight ratio of about 60/40, is not affected appreciably upon the addition of a higher amount (4%) of polyethylene of either melt flow. (Table 3)

TABLE 3

|  | Example | |
|---|---|---|
|  | 3-1 | 3-2 |
| Polycarbonate, wt. % | 39 | 39 |
| Polyethylene terephthalate, wt. % | 57 | 57 |
| Polyethylene |  |  |
| (melt flow 23.0), wt. % | 4 | — |
| (melt flow 9.5), wt. % | 1.5 | 1.1 |
| Impact Strength, ft-lb/in @ ⅛" Notched Izod |  |  |

The table below demonstrates the composition of the invention where the addition of high melt flow polyethylene to PC-rich composition, (PET/Polycarbonate weight ratio of about 30/70) results in a marked increase of the impact strength.

TABLE 4

|  | Example | |
|---|---|---|
|  | 4-1 | 4-2 |
| Polycarbonate, wt. % | 67 | 67 |
| Polyethylene terephthalate, wt. % | 29 | 29 |
| Polyethylene |  |  |
| (melt flow 23.0), wt. % | 4 | — |
| (melt flow 9.5), wt. % | — | 4 |
| Impact Strength, ft-lb/in @ ⅛" Notched Izod | 12.4 | 3.4 |

Viewed in comparison to control compositions (PC/PET weight ratio of 70/30) which contain no polyethylene and having therefore an impact strength of about 2 ft-lb/in., the compositions of the invention indeed represent an unexpected technical advance.

In an additional set of experiments, the results of which are summarized below, the composition of the invention is compared to related compositions which contain polyethylene in amounts outside the scope of the invention. The polyethylene terephthalate resin in this set of experiments was Tenite 7741 which is characterized in that its intrinsic viscosity is about 0.61. The other components, polycarbonate and polyethylene, were the same as the ones used in the above experiments. The impact strength values tabulated below represent the arithmetic average of two experiments.

TABLE 5

|  | Example | | | | | |
|---|---|---|---|---|---|---|
|  | 5-1 | 5-2 | 5-3 | 5-4 | 5-5 | 5-6 |
| Polycarbonate, wt. % | 70.0 | 68.5 | 68.0 | 67.0 | 66.5 | 66.0 |
| Polyethylene terephthalate, wt. % | 30.0 | 29.5 | 29.0 | 29.0 | 28.5 | 28.0 |
| Polyethylene (melt flow 23.0), wt. % | 0.0 | 2.0 | 3.0 | 4.0 | 5.0 | 6.0 |
| Impact Strength, ft-lb/in @ ⅛" Notched Izod | 2.0 | 4.1 | 10.5* | 13.7 | 15.1 | 10.9** |
| Flexural Modulus, ksi × 10² | 3.5 | 3.5 | 3.4 | 3.4 | 3.4 | 3.3 |
| Flexural Strength, ksi | 13.3 | 13.0 | 13.0 | 12.8 | 12.9 | 12.1 |
| Hydrolysis resistance*** MAX. OUTER FIBER STRAIN, % | TENSILE ELONGATION, % | | | | | |
| 0.0 | 120 | 125 | — | 130 | — | 125 |
| 0.32 | 75 | 125 | — | 125 | — | 125 |
| 0.63 | 120 | 130 | — | 125 | — | 125 |
| 0.95 | 110 | 125 | — | 125 | — | 20 |
| 1.26 | 80 | 125 | — | 120 | — | 125 |
| 1.57 | 40 | 50 | — | 120 | — | 115 |
| 1.88 | 25 | 120 | — | 120 | — | 120 |
| 2.19 | 40 | 125 | — | 125 | — | 120 |

*an average of 6.0 and 15.0
**the samples show considerable delamination
***tested after immersing ⅛" tensile bars in distilled water at 65° C. for 7 days under the indicated strain.

It is clear from the results that the composition of the invention which is characterized by its ratio of PET to polycarbonate components, and the amount and melt flow of its polyethylene additive, is superior in impact performance and hydrolysis resistance to corresponding compositions where any of these particular parameters is not met.

Although the invention has been described in detail in the foregoing for the purpose of illustration, it is to be understood that such detail is solely for that purpose and that variations can be made therein without departing from the scope of the invention except as it may be limited by the claims.

What is claimed is:

1. A thermoplastic molding composition comprising:
   (i) 65-75 percent of an aromatic polycarbonate resin,
   (ii) 35-25 percent of a polyethylene terephthalate resin and
   (iii) 3-5 percent of a high density polyethylene resin having a melt flow index of at least about 23.0 gm/10 min. as determined in accordance with ASTM D 1238 said composition being further characterized in that articles molded therefrom exhibit a characteristic ductile impact failure said percents being relative to the weight of the composition.

* * * * *